United States Patent Office 3,223,921
Patented Dec. 14, 1965

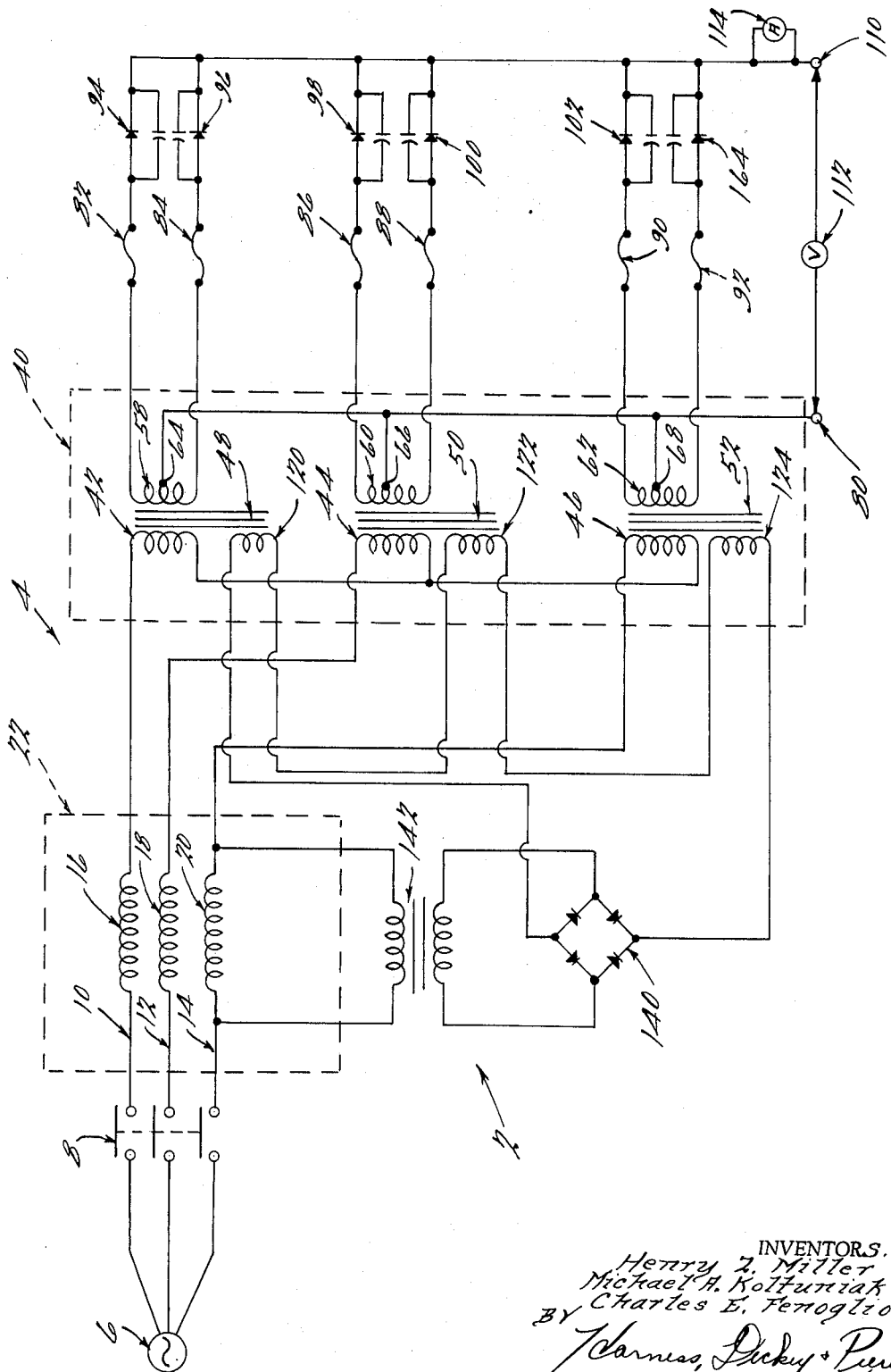

3,223,921
SATURABLE REACTOR CONTROLLED
TRANSFORMER SYSTEM
Henry Z. Miller, Detroit, Michael A. Koltuniak, Warren, and Charles E. Fenoglio, Detroit, Mich., assignors to The Udylite Corporation, Detroit, Mich., a corporation of Delaware
Filed July 12, 1962, Ser. No. 209,444
4 Claims. (Cl. 323—56)

This invention relates generally to control systems, and more particularly to an improved circuit for preloading a saturable reactor used to effect control of an electrical transformer.

Saturable reactors are often used for the control of, for example, power supply transformers where it is desired that the transformer control have a minimum number of moving parts and be relatively dependable in operation. Such saturable reactors generally comprise an A.C. or controlled winding and a D.C. or control winding in operative association on a common magnetic core. The D.C. control winding of the saturable reactor produces a variable flux in the magnetic core thereby varying the effective permeability of the core and hence the reactance of the controlled winding.

However, saturable reactors are relatively uncontrollable when the load thereon, or on the transformer in the case of a saturable reactor used for the control of the transformer, is reduced below, for example, 10% of rated capacity. This problem has been solved, in saturable reactor control circuits heretofore known and used where such a loss of control cannot be tolerated by placing a shunt load on the reactor, for example, a resistance bank in parallel with either the primary or secondary winding of the transformer. However, the power loss incident to the use of such load resistors is appreciable when the power supply controlled by the reactor is operated at rated capacity.

Accordingly, some form of switching device is generally employed to remove the load resistors from the power supply circuit when the load on the transformer, and therefore the reactor, is greater than, for example, 10% of rated capacity. Use of such a switching mechanism is obviously undesirable, since it renders the power supply relatively susceptible to failure. Alternatively, a shunt saturable reactor may be employed to effect preloading of the main reactor as disclosed in application Serial No. 147,288, filed October 24, 1961, and assigned to the assignee of the instant invention. This form of preloading circuit for a saturable reactor has proved successful in field use but is relatively expensive.

A saturable reactor preloading circuit in accordance with an exemplary constructed embodiment of the instant invention obviates the need for load resistors and their associated switching mechanisms, as well as eliminating the need for an auxiliary saturable reactor. The control circuit of the instant invention utilizes a D.C. winding on the magnetic core of the power supply transformer. The D.C. winding on the transformer core effects a predetermined degree of saturation of the transformer core at such times as the transformer secondary is unloaded, thereby inducing sufficient "excitation" flow in the transformer primary winding to render the saturable reactor controllable. The control system is fully automatic after calibration since it is responsive to electrical conditions in the main reactor circuit.

Accordingly, one object of the instant invention is an improved preloading circuit for a saturable reactor.

Another object is a preloading circuit for a saturable reactor that automatically increases the preload on the reactor to a predetermined level upon a decrease in normal operating loads below a predetermined level.

Another object is a preloading circuit for a saturable reactor that automatically decreases the preload on the reactor when load on the reactor increases above a predetermined level.

Other objects and advantages of the instant invention will be apparent in the following specification, claims and drawings, wherein the preloading circuit for a saturable reactor is shown in operative association with a D.C. power supply circuit.

As seen in the drawings, a saturable reactor preloading circuit 2 in accordance with an exemplary constructed embodiment of the present invention, is shown in operative circuit association with a D.C. power supply circuit 4.

The power supply circuit 4 comprises a 460-volt, three-phase, 60 cycle source 6 that is fed through a suitable main disconnect switch 8. Conductors 10, 12 and 14 connect the power source 6 to a plurality of A.C. or controlled windings 16, 18 and 20 of a control saturable reactor 22.

The control saturable reactor 22 is conventional in construction and comprises, for example, conventional D.C. control windings (not shown) operatively associated with the controlled A.C. windings 16, 18 and 20.

A three-phase output transformer bank 40 has a plurality of primary windings 42, 44 and 46 connected to the controlled windings 16, 18 and 20, respectively, of the control saturable reactor 22. The primary windings 42, 44 and 46 of the transformer bank 40 are electromagnetically associated with a plurality of magnetic cores 48, 50 and 52 and secondary windings 58, 60 and 62, respectively. The secondary windings 58, 60 and 62 have center taps 64, 66 and 68 connected to an output terminal 80. Opposite ends of the secondary windings 58, 60 and 62 are connected to fuses 82–84, 86–88 and 90–92, thence to diodes 94–96, 98–100, and 102–104, respectively, which, in turn, are connected to an output terminal 110.

A suitable voltmeter 112 and ammeter 114 reflect power circuit conditions at the output terminals 80 and 110. It is to be noted that the foregoing D.C. power supply circuit is conventional in layout and operation and as disclosed herein for the purpose of setting forth one environment wherein the instant invention has particular utility.

As discussed hereinbefore, the control reactor 22 is relatively uncontrollable when load on the transformer bank 40 comprising, for example, an electroplating bath connected across the terminals 80 and 110, is reduced to 10% or less of rated capacity of the control reactor 22. This problem has heretofore been solved by placing load resistors in parallel with the primary windings 42, 44 and 46 of the transformer bank 40, thereby to maintain at least a 10% load on the reactor 22. However, such load resistors either result in excessive losses or require a disconnect switch to effect removal thereof from the power supply circuit for when the circuit is operating at rated capacity.

In accordance with the present invention, the control reactor 22 is preloaded by the control circuit 2 when load across the terminals 80 and 110, and therefore on the transformer bank 40 and control reactor 22 is reduced to, for example, 10% or less of rated capacity thereof.

The control circuit 2 comprises a plurality of D.C. windings 120, 122 and 124 electromagnetically associated with the cores 48, 50 and 52 of the transformer bank 40, respectively. A suitable D.C. control current is fed to the windings 120, 122 and 124 from opposite sides of a D.C. bridge 140. The D.C. bridge 140 is energized from one side of an auto transformer or, as illustrated in the drawing, a purely inductive transformer 142 that is connected across the controlled windings 20 of the control reactor 22.

The reactor loading circuit 2 is calibrated when load across the output terminals 80 and 110 of the power supply 4 is at a minimum so that the current in the D.C. windings 120, 122 and 124 on the transformer bank 40, and therefore the level of saturation of the cores 48, 50 and 52 is such that flow of current in the primary windings 42, 44 and 46 thereof is sufficient to preload the control reactor 22 to approximately 10% of rated capacity.

As load on the power supply 4 is increased, current in the primary windings 42, 44 and 46 of the transformer bank 40, and therefore in the windings 16, 18 and 20 of the control reactor 22, increases, thereby decreasing the voltage drop across the windings 16, 18 and 20 of the control reactor 22 and correspondingly across the primary winding of the auto transformer 142. The decrease in voltage drop across the primary winding of the auto transformer 142 reduces the flow of D.C. current to the D.C. windings 120, 122 and 124 on the transformer cores 48, 50 and 52, respectively. Thus, preloading of the control reactor 22 automatically increases and decreases as the load on the power supply circuit 4 decreases and increases, respectively.

It is to be understood that the specific construction of the improved control system herein disclosed and described is presented for the purpose of explanation and illustration and is not intended to indicate limits of the invention, the scope of which is defined by the following claims.

What is claimed is:

1. A control system comprising
   a source of alternating current,
   a saturable reactor having a controlled winding electrically connected to one side of said source,
   an output transformer having a primary winding electrically connected to the controlled winding of said saturable reactor,
   a D.C. winding electromagnetically associated with the primary winding of said output transformer, and
   means for producing a D.C. current in said D.C. winding inversely related to load on said saturable reactor so as to alter the magnetic characteristics of said output transformer sufficient to render said saturable reactor controllable when load thereon is decreased below a predetermined minimum.

2. A control system comprising
   a source of alternating current,
   a saturable reactor having a controlled winding electrically connected to one side of said source,
   an output transformer having a primary winding electrically connected to the controlled winding of said saturable reactor, and
   a magnetic core operatively associated with the primary winding thereof,
   a D.C. winding electromagnetically associated with the core of said output transformer, and
   means for producing a D.C. current in said D.C. winding related to the magnitude of the voltage drop across the controlled winding of said saturable reactor whereby the excitation current in the primary winding of said output transformer is sufficient to render said saturable reactor controllable.

3. A system for automatically controlling the preload of a saturable reactor comprising
   a source of alternating current,
   a saturable reactor having a controlled winding electrically connected to one side of said source,
   an output transformer having a primary winding electrically connected to the controlled winding of said saturable reactor, said output transformer having a secondary winding and a magnetic core operatively associated with the primary winding thereof,
   a control transformer having a primary winding electrically connected across the controlled winding of said saturable reactor and a secondary winding,
   a rectifier electrically connected to the secondary winding of said control transformer, and
   a D.C. winding electromagnetically associated with the core of said output transformer and electrically connected to said rectifier whereby current in the D.C. winding of said output transformer induces a magnetic flux in the core thereof and a current in the primary winding thereof sufficient to preload said saturable reactor to a predetermined minimum.

4. A control system comprising
   a source of alternating current,
   a saturable reactor having a controlled winding electrically connected to one side of said source,
   an output transformer having a primary winding electrically connected to the controlled winding of said saturable reactor, said output transformer having a secondary winding and a magnetic core operatively associated with the primary winding thereof,
   a control transformer having a primary winding electrically connected across the controlled winding of said saturable reactor and a secondary winding,
   a rectifier electrically connected to the secondary winding of said control transformer, and
   a D.C. winding electromagnetically associated with the core of said output transformer and electrically connected to said rectifier whereby current in the D.C. winding of said output transformer increases upon the occurrence of a decrease in load across the secondary of said output transformer and decreases upon an increase of load across the secondary of said output transformer thereby to induce a flux in the magnetic core of said output transformer inversely related to load so as to render said saturable reactor controllable under all load conditions.

References Cited by the Examiner

UNITED STATES PATENTS 2,994,815  8/1961  Burski _____ 323—89

LLOYD McCOLLUM, *Primary Examiner.*